(12) United States Patent
Mason et al.

(10) Patent No.: US 11,163,367 B2
(45) Date of Patent: Nov. 2, 2021

(54) METHOD OF OBTAINING GESTURE ZONE DEFINITION DATA FOR A CONTROL SYSTEM BASED ON USER INPUT

(71) Applicant: SIGNIFY HOLDING B. V., Eindhoven (NL)

(72) Inventors: Jonathan David Mason, Waalre (NL); Dzmitry Viktorovich Aliakseyeu, Eindhoven (NL); Sanae Chraibi, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 254 days.

(21) Appl. No.: 15/326,851

(22) PCT Filed: Jul. 16, 2015

(86) PCT No.: PCT/EP2015/066352
§ 371 (c)(1),
(2) Date: Jan. 17, 2017

(87) PCT Pub. No.: WO2016/009016
PCT Pub. Date: Jan. 21, 2016

(65) Prior Publication Data
US 2017/0205891 A1 Jul. 20, 2017

(30) Foreign Application Priority Data

Jul. 17, 2014 (EP) ..................................... 14177477

(51) Int. Cl.
*G06F 3/01* (2006.01)
*G06F 3/00* (2006.01)
*G06F 3/03* (2006.01)
*G06F 3/0488* (2013.01)
(Continued)

(52) U.S. Cl.
CPC .............. *G06F 3/017* (2013.01); *G06F 3/005* (2013.01); *G06F 3/0304* (2013.01);
(Continued)

(58) Field of Classification Search
CPC ........ G06F 3/017; G06F 3/0346; G06F 3/048; G06F 3/011–015; G06F 3/005;
(Continued)

(56) References Cited

U.S. PATENT DOCUMENTS 7,453,471 B2 * 11/2008 Fukui ..................... G03B 15/00
345/633
9,229,540 B2 * 1/2016 Mandella ............ G06F 3/03545
(Continued)

FOREIGN PATENT DOCUMENTS

EP 2661155 A1 11/2013
JP 2011186892 A2 9/2011
(Continued)

*Primary Examiner* — Liang Y Li

(57) ABSTRACT

The invention is directed at a method of obtaining gesture zone definition data for a control system based on user input, wherein said user input is obtained through a mobile communication device external to said control system, the method comprising: receiving, by an image capture device, images of a space, and determining from the images, by a controller, a location data of the mobile communication device; providing, through the mobile communication device, a feedback signal in response to said determining of the location data, the feedback signal providing feedback information on said location data; receiving, via an input unit of the mobile communication device, an input signal indicative of an instruction command, and determining, by the controller, based on said instruction command, the gesture zone definition data. The invention is further directed at a method of operating a mobile communication device, to a computer program product, and to a control system.

10 Claims, 8 Drawing Sheets

(51) Int. Cl.
*G08C 17/02* (2006.01)
*H04M 1/72412* (2021.01)
*G06T 19/00* (2011.01)
*H04L 12/28* (2006.01)

(52) U.S. Cl.
CPC ........ *G06F 3/04883* (2013.01); *G06T 19/006* (2013.01); *G08C 17/02* (2013.01); *H04L 12/2816* (2013.01); *H04M 1/72412* (2021.01); *G06F 2203/04808* (2013.01); *G08C 2201/32* (2013.01)

(58) Field of Classification Search
CPC ..... G06F 1/1694; G06F 3/0488–04886; G06F 2203/04808; G06F 3/0304–0325; H04L 12/2803–12/2838; H04L 2012/284–285; H04W 4/04; G06T 19/006; G05B 19/418–41895; G08C 17/02; G08C 2201/32; H04M 1/72412
See application file for complete search history.

(56) References Cited

U.S. PATENT DOCUMENTS 9,891,712 B2\* 2/2018 Cohen .................. G06F 3/0304
9,934,611 B2\* 4/2018 Schmalstieg ............. G06T 7/12
2009/0027337 A1 1/2009 Hildreth
2009/0183125 A1 7/2009 Magal et al.
2010/0224420 A1\* 9/2010 Miyanaga ............... G01G 19/44
  177/25.12
2011/0074710 A1\* 3/2011 Weeldreyer ......... G06F 3/04883
  345/173
2011/0193939 A1\* 8/2011 Vassigh .................. G06F 3/017
  348/46
2011/0294515 A1\* 12/2011 Chen ..................... H04W 64/00
  455/456.1
2011/0296353 A1 12/2011 Ahmed et al.
2013/0093727 A1 4/2013 Eriksson et al.
2014/0002444 A1\* 1/2014 Bennett .................. G06F 3/012
  345/419
2014/0168062 A1\* 6/2014 Katz ..................... G06F 3/0484
  345/156
2015/0153822 A1\* 6/2015 Kauffmann .............. G06K 9/00
  345/156
2015/0316985 A1\* 11/2015 Levesque ............. G06T 19/006
  345/156

FOREIGN PATENT DOCUMENTS

WO 2010009152 A1 1/2010
WO 2011073881 A1 6/2011
WO 2012049656 A2 4/2012

\* cited by examiner

METHOD OF OBTAINING GESTURE ZONE DEFINITION DATA FOR A CONTROL SYSTEM BASED ON USER INPUT

CROSS-REFERENCE TO PRIOR APPLICATIONS

This application is the U.S. National Phase application under 35 U.S.C. § 371 of International Application No. PCT/EP2015/066352, filed on Jul. 16, 2015, which claims the benefit of European Patent Application No. 14177477.8, filed on Jul. 17, 2014. These applications are hereby incorporated by reference herein.

FIELD OF THE INVENTION

The present invention is directed at a method of obtaining gesture zone definition data for a control system based on user input. The invention further relates to a method of operating a mobile communication device, to a computer program product, and to a control system.

BACKGROUND OF THE INVENTION

The present document relates to control systems for controlling utility devices in environments such as houses, buildings or similar areas. Although there are different types of such control systems available, some control systems are based on monitoring a space such as a room, a hallway or other area, for detecting certain conditions such as activity, light level. A specific type of control system for example also recognizes specific gestures intended for controlling a utility device, e.g. for switching on a light, for operating a television or for closing the curtains. Such systems may be based on monitoring a specific area in the space wherein such gestures, or other detectable features or conditions, may be detected. These areas are hereinafter referred to as 'gesture zones'. The present invention is directed at commissioning such gesture zones for use thereof by the control system.

In the US patent publication 2011/296353A1 a user centric interaction zone is described for remotely controlling a device. In US patent publication 2009/027337A1 a detection region for detecting gestures for remotely controlling a device is described, wherein the detection region is based on the abilities and restrictions of a user's body in making gestures (e.g. length or the arm).

SUMMARY OF THE INVENTION

It is an object of the present invention to provide a method of obtaining gesture zone data which is user friendly, intuitive to a user, and allows for a high level of control of various features.

To this end, there is provided herewith a method of obtaining gesture zone definition data for a control system based on user input, wherein said user input is obtained through a mobile communication device external to said control system, the method comprising: receiving, by a sensor device, a sensor signal and determining from the sensor signal, by a controller, a location data of the mobile communication device; providing, through the mobile communication device, a feedback signal in response to said determining of the location data, the feedback signal providing feedback information on said location data; receiving, via an input unit of the mobile communication device, an input signal indicative of an instruction command, and determining, by the controller, based on said instruction command, the gesture zone definition data.

In the method of the present invention, the control system cooperates with a mobile communication device to allow generation, commissioning and/or modification of gesture zone definition data. Gesture zone definition data is data that defines properties of the gesture zone to be monitored by the control system. These properties may for example be the size, shape, any boundaries, the utility device for which the zone is intended, or the function to be controlled; however these are mere example properties and the skilled person may recognize other properties of gesture zones that may be defined or modified using the method of the present invention.

The mobile communication device may be any suitable communication device, such as a smart phone, a personal digital assistant (PDA), a tablet type computer, a smart watch or bracelet. Such device enable data communication with other devices, e.g. via Wi-Fi, Bluetooth, or mobile telecommunications networks such as global system for mobile communications (GSM), general packet radio service (GPRS), long term evolution (LTE), or further evolved versions of such networks or alternative types of (short or long range) wireless data communication. Moreover, the mobile communications devices provide an ideal user interface to enable interaction, using feedback and user input. Many of such devices for example comprise high resolution display screens, often also touch sensitive screens, image and/or sound capture facilities, keyboards, accelerometers and the like. This user interface may advantageously used for providing feedback to a user regarding the existing or to-be-defined gesture zones, and to allow a user to verify and/or modify the specifics and parameters of the gesture zones to-be-define or to-be-modified by means of the input devices on the mobile communication device. Since many persons carry mobile communication devices with them on a daily basis, such devices may advantageously be used for controlling such daily used control systems.

The location data is determined based on a sensor signal received from a sensor device. A well working embodiment uses an image capture device for receiving images of a space, and determines the location data from the received images. Such an image capture device may be comprised by either the control system or the mobile communication device. Other sensor signals may also alternatively or additionally be used for determining location data, such as zigbee signal strength measuring, or the use of an ultrasound transceiver while triangulating ultrasound signals, or other echo type sensors that enable imaging based on an echo signal received in response to a source signal transmission. Since, however, image capture equipment is in many cases already available in mobile communication devices, and is also easily implemented in control systems, the use of an image capture device is a preferred embodiment.

The controller that determines the gesture zone definition data based on the instruction command may be a controller comprised by the control system, or may be located in the mobile communication device. Dependent on how the invention is implemented, and where the controller is located in this respect, data is to be exchanged between the control system and the mobile communication device. For example, the mobile communication device may provide the user interface only for allowing the user to obtain information on a to-be-defined gesture zone, while the control system itself determines the location of the mobile communication device based on images received from image capture equipment also comprised by the control system. In that case, the control system may send the location data to the mobile communication device for allowing it to provide the feedback signal, e.g. an on-screen visualization of the location data to be used for defining where the gesture zone to-be-created will be located. Also, the mobile communication device may transmit data relating to instruction commands back to the control system after obtaining the input signal via the input unit (e.g. touch sensitive screen, keyboard, etc.). In a different implementation, wherein the controller that determines or generates the gesture zone definition data is included by the mobile communication system, at least the gesture zone definition data may be transmitted to the control system after generation thereof such as to enable the control system to store and use the definition data.

As mentioned above, gesture zone may be associated with a specific utility device or group of devices to be controlled by the control system. Moreover, it may also be possible to associate the gesture zones with a typical function of a device to be performed, or with combinations of functions. In case a utility device is associated with a gesture zone, this gesture zone may for example be commissioned to exclusively control a lamp, or more general the lighting conditions of the space, while other gesture zones may be associated with the control of an audio system. This is however optional; a gesture zone may also be commissioned to generally identify gestures meant for operating the control system, e.g. in case the control system distinguishes between different sorts of gestures made to perform specific control actions. Similarly, also specific functions may be associated with gesture zones, such as functions of a specific utility device (e.g. controlling the audio volume of a television, switching a lamp on or off, or rotating the slats of a Venetian blind or other sun screen) or combinations of functions (e.g. turning on the an audio system while dimming the lights to a comfortable level and switching on a reading light near an armchair).

In accordance with an embodiment, the image capture device that receives the images of the space may be comprised by the control system, wherein the method further comprises the control system transmitting the location data to the mobile communication device in response to said determining of the location data. In that case, the image capture device that monitors the space for monitoring the defined gesture zones, may be used for identifying the location of the mobile communication device. For example, by means of applying a recognition algorithm the control system may be able to recognize the mobile communication device. Although such an image capture device may be capable of receiving two dimensional images for monitoring the space in 2D, preferably embodiments may apply the use of an image capture device that is able to capture three-dimensional images of a space, and thereby immediately determining the location data from the images captured.

In yet another embodiment of the present invention, the image capture device is comprised by the mobile communication device, wherein the controller determines the location data of the mobile communication device by establishing module data of the space based on the received images, and by determining the location of a view point of the image capture device based on the module data for providing the location data. Many mobile communication devices nowadays comprise an on-board camera that can be used for capturing images of the surrounding space. By taking images of the space from different positions, or simply by moving the mobile communication device while operating the image capture device, a three-dimensional model of the space may be created by the device. The three-dimensional model data of the space that is based on the received images may be used for determining where the location of the camera (and the attached mobile communication device) is in relation to other features of the space, such as windows, objects, or doors. As may be appreciated, where the mobile communication device is itself capable of establishing the location data with respect to the space, it is possible to carry out most of the steps of the present invention on the mobile communication device, and communicate the result, i.e. the gesture zone definition data, back to the control system after defining the gesture zone. As may be appreciated, hybrid forms of communication may also be possible, for example wherein the step of determining the location data from the images is performed by the mobile communication device itself, whereas determining the gesture zone definition data based on the instruction commands may be performed by controller comprised by the control system, or vice versa.

In accordance with a further embodiment, the method may further include a mobile communication device receiving an existing gesture zone definition data of an existing gesture zone from the control system. For example, the mobile communication device may be used for modifying an existing gesture zone, and may first receive the definition data for one or more existing gesture zones that are presently used by the control system. Also, without modifying such data, the mobile communication device may receive existing gesture zone definition data such as to visualize the presence of existing gesture zones in an augmented reality setting, or otherwise providing feedback on existing gesture zones within the space of interest. In accordance with yet a further embodiment, the step of determining gesture zone definition data involves determining modified gesture zone definition data for modifying the existing gesture zone. In particular in various implementations of these latter embodiments, it is advantageous to enable the user to, for example, move around in the space of interest, and be informed of the presence of absence of gesture zones used by the control system. In an augmented reality setting, the user may for example simply consult the display screen of the mobile communication device, and immediately see a visual representation of existing gesture zones in the room, including for example information on the function or the utility device operated by means of the gesture zones.

Feedback may be provided in embodiments of the present invention in various different ways via the mobile communication device. In accordance with various embodiments, providing the feedback signal includes at least one of a group comprising displaying on a display screen of the mobile communication device at least one of: the location data, a visual representation of the space including a location indicator based on the location data; displaying on a display screen of the mobile communication device, based on the location data and/or the gesture zone definition data determined by the controller or received from the control system, at least one of: a visual representation of a gesture zone, a property of a gesture zone, a visual representation of a gesture zone embedded in an image of the space—such as an augmented reality representation; providing, based on the gesture zone definition data determined by the controller or received from the control system, an audio signal indicative of at least one of: a presence or absence of a gesture zone at a location corresponding with said location data, the size of a gesture zone, the location of a boundary of a gesture zone, a direction wherein a gesture zone may be located relative to a location corresponding with the location data; providing, based on the gesture zone definition data determined by the controller or received from the control system, a haptic signal indicative of the presence or absence of an existing gesture zone at a location corresponding with said location data, the size of a gesture zone or the location of a boundary of a gesture zone. As may be appreciated other forms of providing feedback that are not specifically mentioned hereinabove may be possible, for example dependent on specific output devices or feedback devices included by the mobile communication terminal. The term 'haptic signal' may include various kinds of feedback signals that are observable by the user, for example a vibration of the mobile communication device.

In accordance with yet a further embodiment the mobile communication device comprises a touch sensitive display screen, wherein providing the feedback signal includes displaying on the display screen a visual representation of a gesture zone, and wherein the step of receiving of the input signal comprises manipulating the visual representation on the display screen by means of touch gestures and generating manipulation instruction commands corresponding to said manipulating. The method may for example include visualizing the boundaries of a gesture zone, or the shape of a gesture zone on the touch screen, and the user using a touch screen gesture (such as pinching, stretching, swiping, tapping, turning, or other gestures) for adjusting the specifics such as the size and shape of the gesture zone. For example pinching and stretching may make the gesture zone smaller and larger, drawing a form on the touch screen using a finger or stylus may define a specific shape, and/or tapping or double tapping may visualize a selection man . . . or input window for setting certain specifics of the gesture zone to be defined (the function or associated utility device, or a manual input for setting the size, etc.).

In another embodiment of the invention, the input unit comprises at least one element of a group comprising: an accelerometer or a gyroscope wherein the step of receiving input includes receiving motion data of the mobile communication device, a keyboard or button for receiving said input signal, an audio sensor wherein said input signal comprises a sound or voice command. Any of such alternatives may be used for receiving input for manipulating gesture zone data. Moreover, voice commands may be recognized using onboard speech recognition functionality of the mobile communications device. Also, small screen mobile communications devices may benefit from the option of using buttons or keyboard input, although this option may of course also be applied by smart phone implementations.

In yet a further embodiment of the present invention, in the step of receiving the input signal, the input signal is indicative of at least one of a group comprising a gesture zone definition confirmation for confirming gesture zone definition data; a manipulation instruction for modifying gesture zone definition data, such as a size or shape of a gesture zone; a function specification for defining or modifying an associated function of a gesture zone; a utility device specification for modifying a utility device associated with the gesture zone and controllable via the control system. The skilled person may appreciate that other input signals and input means are possible dependent on the specifics of the mobile communication device used in combination with a control system.

In accordance with yet a further embodiment the step of determining location data comprises determining location sequence data representative of a motion of the mobile communication device along a trajectory through the space, and wherein determining the gesture zone definition data comprises determining a size and or shape of a gesture zone based on the location sequence data. The user may for example move his/her mobile communication device following a specific pattern or trajectory in space, which sets the shape and size of the gesture zone to be defined.

In yet a further embodiment, the step of receiving an input signal includes receiving an input signal from an accelerometer or gyroscope comprised by the mobile communication device, and using said input signal in addition to or instead of said images of the space, for determining the location sequence data.

The use of such means may be additional to, or instead of using the image capture equipment for determining the location sequence data. For example, the method may start by establishing location data of a starting location of the mobile communication device, e.g. using the method of the present invention as defined above with the image capture equipment, and from there the accelerometer or gyroscope may be used to establish the trajectory of the mobile communication device moved through the space by the user. Where these input means are used in addition to the images captured from the image capture equipment, this may be beneficial to the accuracy of the received location sequence data.

In accordance with a second aspect of the present invention there is provided a method of operating a mobile communication device for obtaining gesture zone definition data for a control system, the method including: receiving by the mobile communication device images of a space obtained using an image capture device; determining from the images a location data of the mobile communication device by a controller; providing via an output unit of the mobile communication device a feedback signal in response to said determining of the location data, the feedback signal providing feedback information on said location data; receiving via an input unit of the mobile communication device an input signal indicative of an instruction command, and determining based on said instruction command, the gesture zone definition data by the controller.

In accordance with yet a third aspect of the present invention a computer program product comprising instruction for enabling a mobile communication device to perform a method in accordance with the second aspect, or a method in accordance with the first aspect, when loaded onto the mobile communication device.

In accordance with a fourth aspect of the present invention there is provided a control system for controlling one or more utility devices in an environment, the control system comprising an image capture device for obtaining images from a space, and a controller for determining from said images location data of a mobile communication device in said space, further comprising transceiver means for exchanging data with the mobile device, for providing the location data to the mobile communication device and for receiving gesture zone definition data from the mobile communication device.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

The present invention may be used with a control system that applies the monitoring of one or more gesture zones to interact with a user such as to receive user input for controlling the utility devices to be controlled, such as lighting devices, an audio system, a television, window blinds or a curtain, door locks, alarm systems, central heating systems, and the like. A gesture zone is a monitoring area of a space that can be monitored by the control system using image capture equipment. Preferably, such image capture equipment enables to perform three dimensional (3D) imaging or enable to monitor the space in 3D (e.g. by enabling distance estimation based on the images received). However, the present invention may be applied in a two dimensional (2D) setting at the cost of some specific functionality that is related to the 3D aspects. In the present description, a 3D control system is assumed, i.e. enabling to distinguish between gesture zones and locations in three dimensions.

As an example, a control system may be considered wherein lighting may be controlled by selecting light scenes by placing a hand into an invisible active area, i.e. a gesture zone, that a user has predefined. This means that the user can control multiple connected lights with one easy action. Moreover, the gesture zones can be placed in locations in an environment that are meaningful to those who define them. For example, someone may place a gesture zone near their favorite chair in which they like to read and use this active area to turn on or off their cozy reading light setting. To the proximity of the active areas to physical locations of the end users will easily remember where they are.

Figure 1:
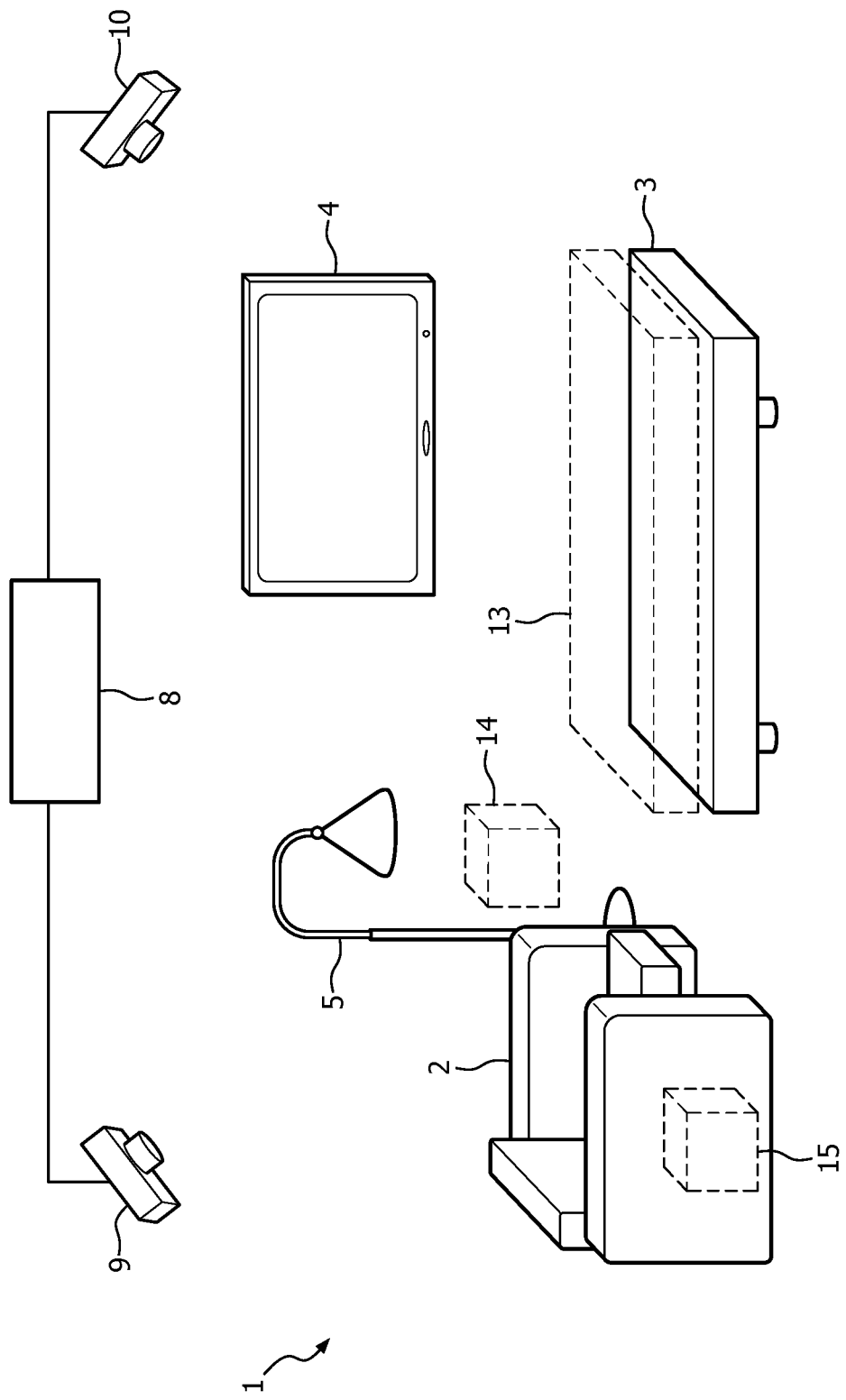
FIG. 1 schematically illustrates a control system using gesture zones.

FIG. 1 schematically illustrates an example space 1, i.e. a living room, wherein a control system and method in accordance with the present invention may be applied. The living room 1 includes some furniture and special features, such as an arm chair 2, a coffee table 3, a television 4 and a lamp 5. In the living room 1 a control system 8 including monitoring cameras 9 and 10 are installed. The monitoring cameras 9 and 10 permanently monitor living room 1 for detecting gestures such as hand signals made by a user and for detecting various other features that may be usable for controlling utility devices in the living room 1. Such utility devices for example may include television 4 and lighting unit or lamp 5. As may be appreciated, other utility devices that are not illustrated here may for example include an audio system, curtains or window blinds, an alarm system, a central heating system, kitchen appliances such as a microwave, a cooker hood or a dishwasher, and any other utility devices that may advantageously be controlled using a control system 8.

In particular, the monitoring cameras 9 and 10 monitor three dimensional gesture zones 13, 14 and 15 located at user selected positions in the living room 1. The owner of the control system 8 may have defined the gesture zones 13, 14 and 15 at the suitable positions for operating the appliances (e.g. television 4 and lamp 5) to be operated. Although different control methods and methods of operation may apply to the control system 8 for distinguishing which function is to be performed for which utility device based on gesture activity detected in any of the gesture zones 13-15, in the present example the user may simply reach out for gesture zone 15 to switch the television 4 on or off. Alternative, or in addition, the user may perform different gestures within gesture zone 15 for operating different functions of the television 4. For example keeping the hand of the user level in gesture zone 15, and raising the hand upwards may be understood by the control system 8 as increasing the sound volume of television 4. Other gestures performed in gesture zone 15 may control other functions of television 4. Alternatively, different gesture zones may be defined for each function or for some functions of the television 4. This is completely configurable to the user of control system 8.

If the user reaches out his hand to gesture zone 14, the lamp 5 is switched on. Moreover, in case the user may place a cup of coffee on the coffee table 3, within gesture zone 13, this control system 8 may interpret this as a gesture for switching to a specific preprogrammed lighting ambience controlling a plurality of lamps in a living room. This may, for example, also be performed dependent on the current time of the day, or whether this happens before or after sunset. As will be appreciated, all the gesture zones, such as gesture zones 13-15, are to be commissioned and programmed by the user. For commissioning gesture zones such as gesture zones 13-15, gesture zone definition data has to be created and stored in the control system. This gesture zone definition data may define the exact location of the gesture zone in the space 1, the shape and size of the gesture zone, and other properties such as which utility device to associate the gesture zone with, and which function to control. To commission the various gesture zones, a method of the present invention may be applied.

Figure 2:
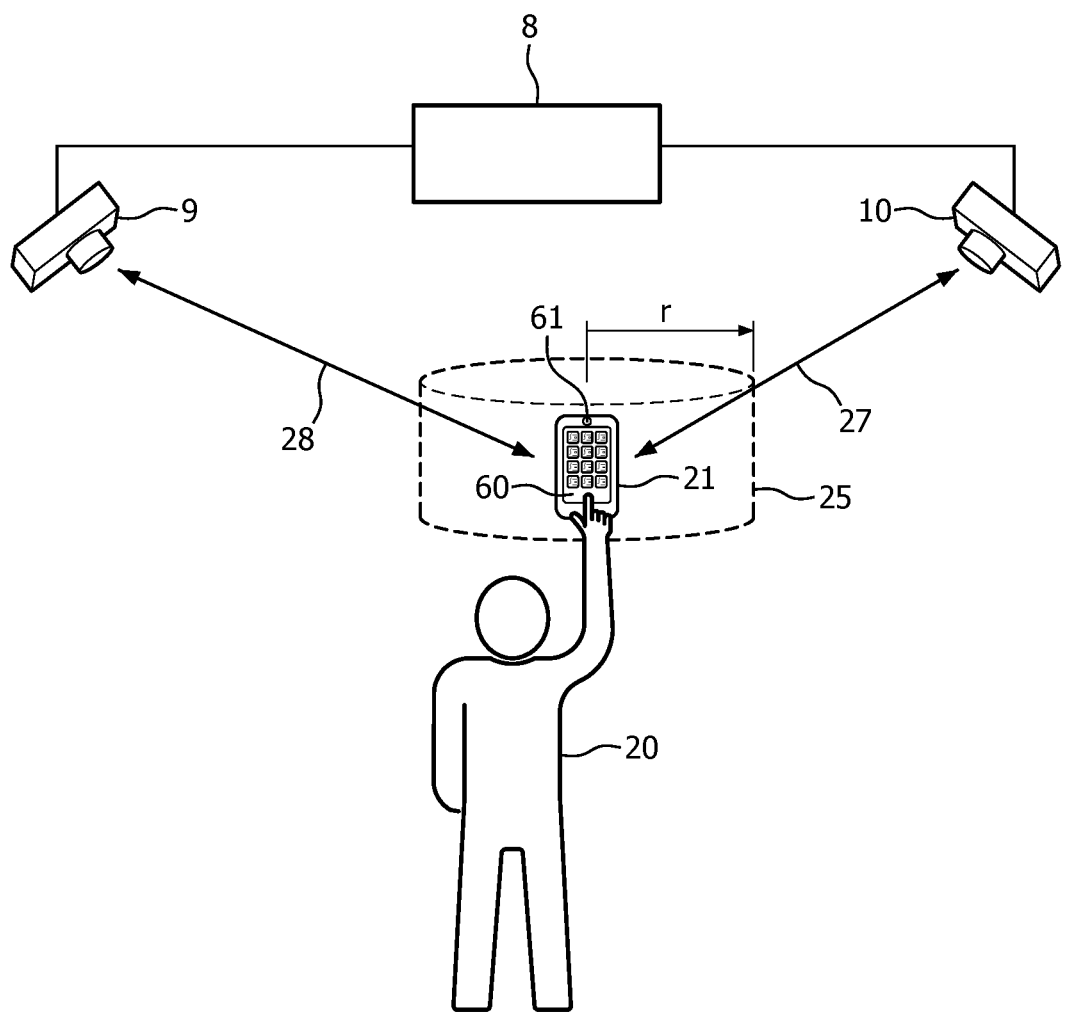
FIG. 2 schematically illustrates the method of the present invention.

FIG. 2 schematically illustrates an embodiment of the method of the present invention for commissioning a gesture zone. In FIG. 2, a user 20 holds a mobile communication device 21 i.e. a smart phone 21, and a desired location in the space monitored. Optionally, the method may be started by the user pressing a button (e.g. button 62) or providing other input to either the phone 21 or the control system. The monitoring cameras 9 and 10 of control system 8, which are able to monitor the living room 1 in three dimensions, i.e. enabling to determine an exact three-dimensional position in the space 1, receive images including mobile communication device 21. With the images received from monitoring cameras 9 and 10, the exact location of the smart phone 21 of the user 20 can be established by the control system 8, generating location data for the smart phone 21. Recognizing the smart phone 21 may be implemented by means of image recognition algorithms. Also more sophisticated methods may be applied for signaling to the control system 8 that smart phone 21 is nearby and may be detected through the monitoring cameras 9 and 10. Once the location data of the location of a smart phone 21 has been determined by the control system 8, this data may be transmitted to smart phone 21, e.g. via Wi-Fi or Bluetooth as may be appreciated, prior to starting detecting of the location of the smart phone 21, the user may have indicated on the smart phone 21 that a new gesture zone has to be commissioned, and an instruction to this end and any indicative signal may have been transmitted from the smart phone 21 to the control system.

Once the location data has been received by smart phone 21, a standard gesture zone 25 may be automatically created by the control system 8. The default gesture zone may have a default radius r and may be of a default height. As will be appreciated, instead of defining a default sized and shaped gesture zone 25 at a location of smart phone 21, the user may specify a desired size and shape of the gesture zone using his smart phone 21. Alternatively even, the default gesture zone 25 may be modified by the user based on feedback provided via touch screen 60 of the smart phone 21.

Figure 3B:
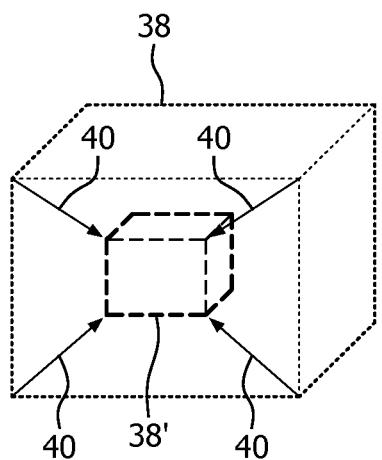
FIGS. 3A and 3B illustrate a pinch gesture usable with the present invention.
Figure 3A:
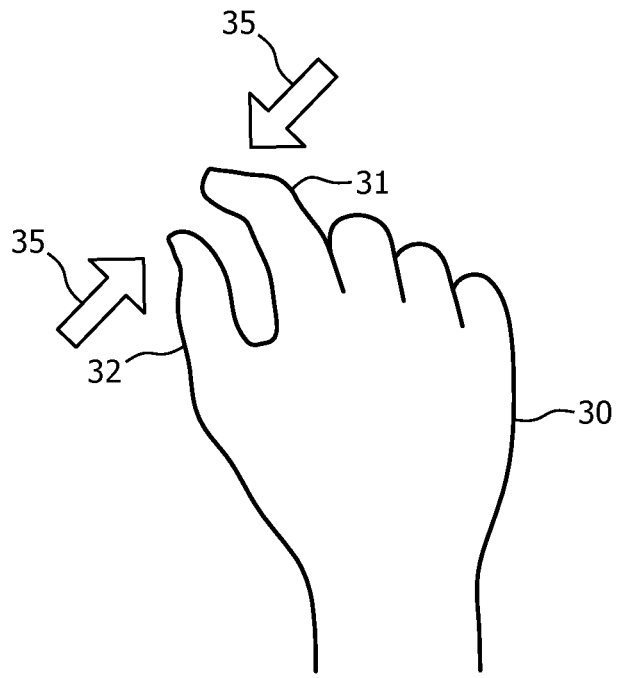

Examples of how the size and shape of the gesture zone may be modified by the user using his smart phone 21 with touch screen 60 are illustrated in FIGS. 3A/B, 4A/B, 5A/B, 6A/B and 7A/B. As may be appreciated in addition to the specific interactions and manners of providing input illustrated in these figures, input may be provided by the user via his smart phone 21 in many other ways that may be apparent to the skilled person, without departing from the present invention.

Turning to FIGS. 3A and 3B, the user 20 may use the index finger 31 and thumb 32 of his hand 30 to perform a pinch touch gesture as indicated by arrows 35 on the touch sensitive screen 60 of the smart phone 21. The pinch gesture 35 may for example decrease the size of a to be defined gesture zone 38 to yield a smaller gesture zone 38'. This is indicated in FIG. 3B by arrows 40.

Figure 4B:
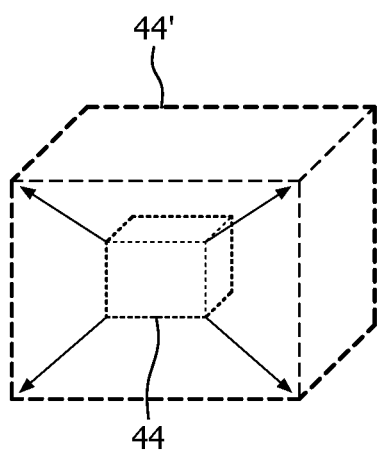
FIGS. 4A and 4B illustrate a stretch gesture usable with the present invention.
Figure 4A:
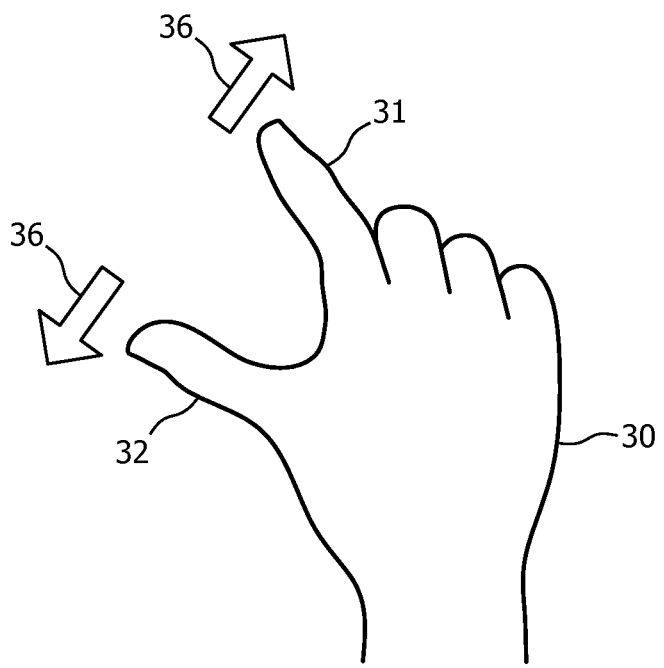

Alternatively, as indicated in FIGS. 4A and 4B, the user 20 may use the index finger 31 and thumb 32 of his hand 30 to perform a stretch touch gesture 36 on the touch sensitive screen 60 of the smart phone 21. Performing a stretch gesture 36 may increase the size of a potential gesture zone 44 towards a larger to be defined gesture zone 44'. As may be appreciated, feedback on the performed modification indicated in FIGS. 3A, 3B, 4A and 4B may be provided via the touchscreen 60 of the smart phone 21.

Figures 5A, 5B:
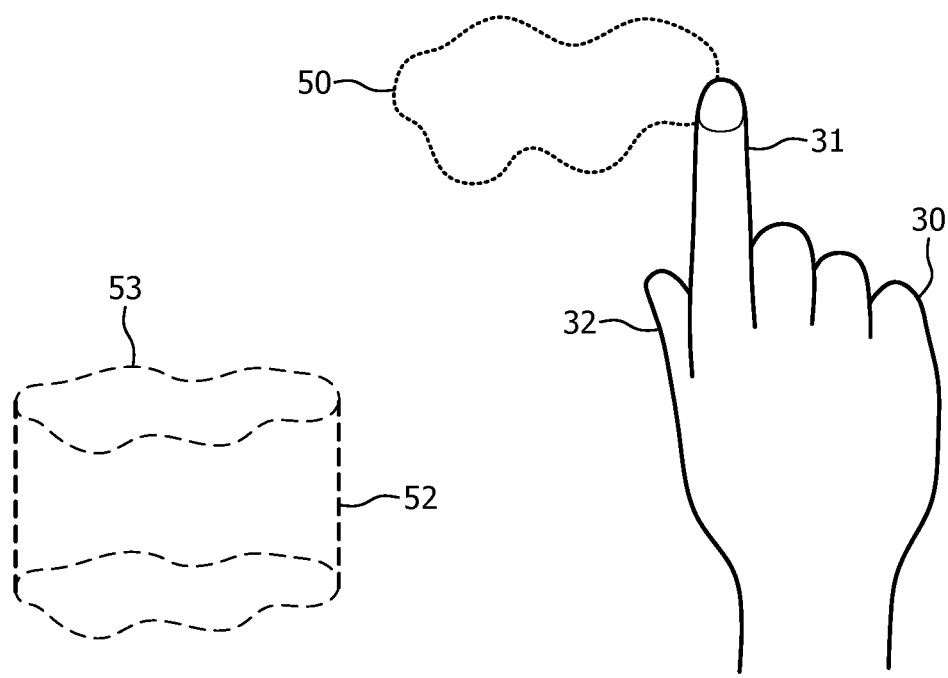
FIGS. 5A and 5B illustrate a draw gesture usable with the present invention.

Likewise, a further alternative is illustrated in FIGS. 5A and 5B. In FIGS. 5A and 5B, the user 20 uses his index finger 31 of his hand 30 to draw an arbitrary shape 50 on the touch sensitive screen 60 of the smart phone. This may be interpreted by the controller (e.g. of the smart phone 21) as the desired shape of gesture zone 52 to be defined. Gesture zone 52 illustrated in FIG. 5B comprises a cross section with boundary 53 corresponding to the shape 50 which is drawn by the user 20 using his index finger 31.

Figures 6A, 6B:
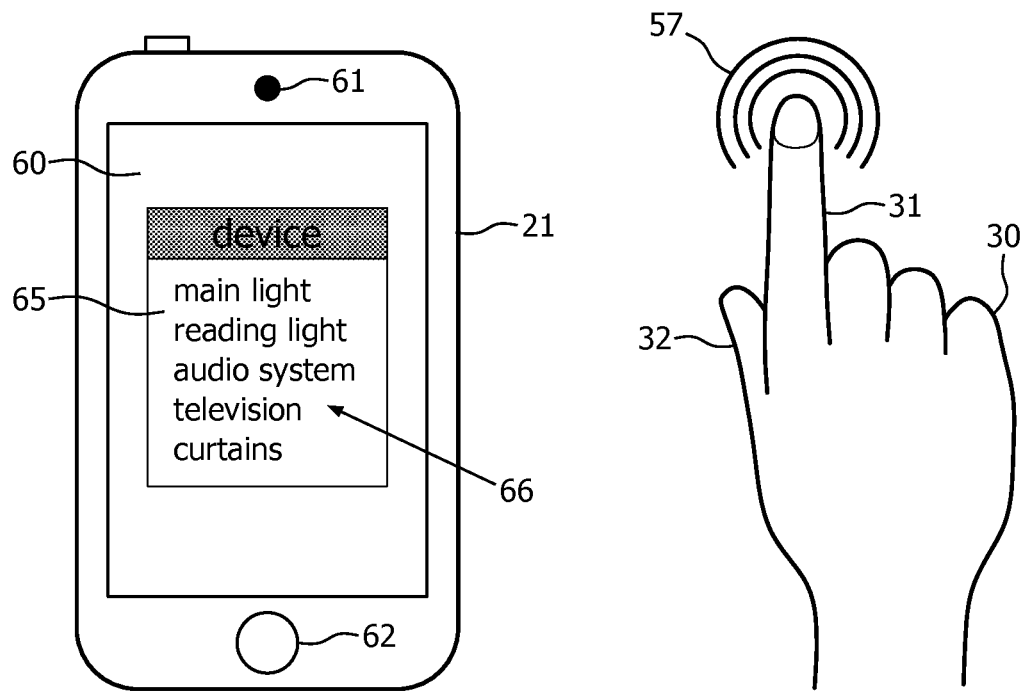
FIGS. 6A and 6B illustrate a first tab gesture usable with the present invention.

As a further alternative, as illustrated in FIGS. 6A and 6B, the user may tap his index finger 31 on the touch sensitive screen 60 of the smart phone 21 once, as indicated in FIG. 6A as touch gesture 57. By tapping the touch sensitive screen 60, a selection menu or window 65 may appear on the screen 60 providing the options 66 that can be selected by the user 20. The selection menu 65 may for example enable the user to select the corresponding utility device that is to be associated with a gesture zone to be defined. The selection from the menu 65 may be made by tapping on the desired option of the menu 65 on the screen, or alternatively by operating a control button, such as button 62.

Figure 7B:
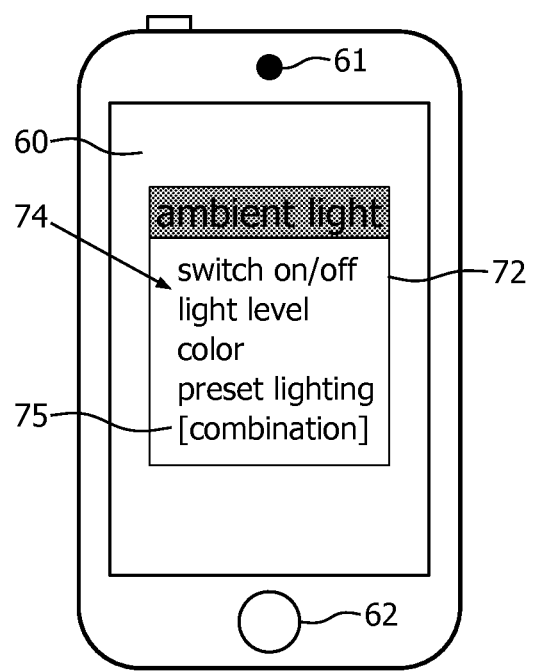
FIGS. 7A and 7B illustrate a second tab gesture usable with the present invention.
Figure 7A:
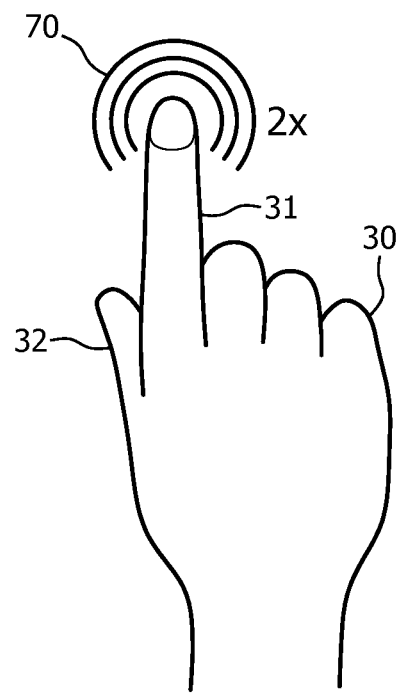

Yet a further alternative is illustrated in FIGS. 7A and 7B. In FIG. 7A, a user 20 uses his index finger 31 of hand 30 to tap twice, as indicated as gesture 70, on the touch sensitive display screen 60 of smart phone 21. By tapping twice (70), a window or selection menu 72 is displayed on screen 60 including the various functions 74 that may be associated with the to-be-defined gesture zone. In the present embodiment, the user will associate the to be defined gesture zone with the ambient light, and the various options for switching the light on and off, for changing the light level, or the color are presented in the menu 72. It is also possible to associate the gesture zone with a specific pre-set lighting condition or a preprogrammed light level. A special option that may be available is to associate the to-be-defined gesture zone with a combination of various functions of various devices that may be controlled by the control system 8, as indicated by option 75. For example, a plurality of lamps in the space 1 may be operated at once to establish a specific lighting condition. Moreover, the combination may operate a reading light in combination with switching on the audio system for establishing soft background music, for example in case the user wants to read a book in his favorite armchair 2.

Figure 8:
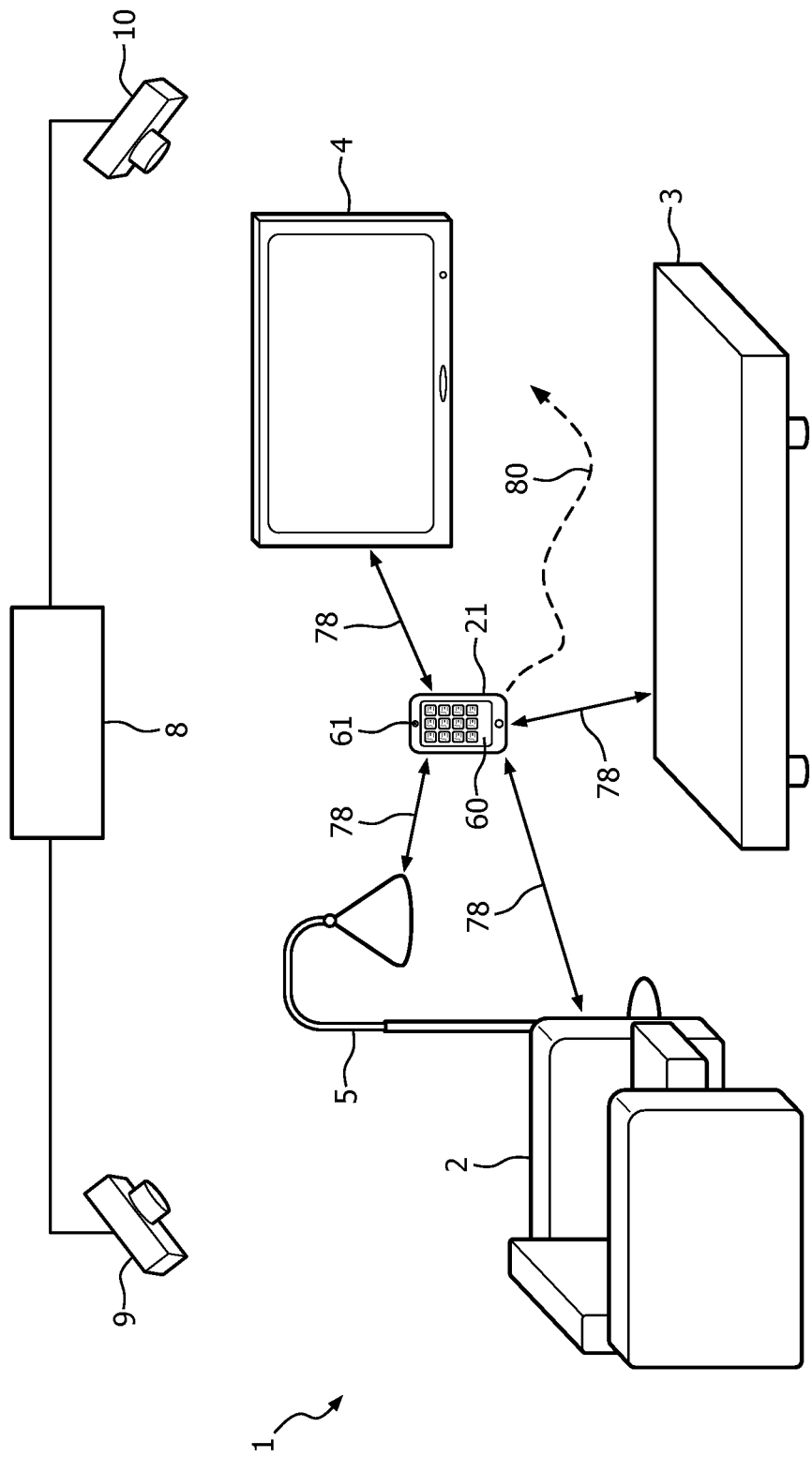
FIG. 8 illustrates a further embodiment of the present invention.

In FIG. 8, an alternative embodiment of the method of the present invention is schematically illustrated, wherein the smart phone 21 is able to determine the location data of his location without the help of the control system 8. In the embodiment illustrated in FIG. 8, the smart phone 21 itself comprises image capture device 61, i.e. an onboard camera. Many mobile communication device nowadays even comprise more than one onboard camera, e.g. one on the front side and one on the back size of the mobile communication device.

By moving the smart phone 21 through the living room 1, for example as illustrated in FIG. 8 by trajectory 80, the smart phone 21 may be able to compare the images captured by camera 61 and from this, to establish a 3D module (generating 3D module data) of the space 1 and the objects and features 2-5 therein. Using the 3D module data of the room 1, the smart phone 21 may be able to determine its exact location in the room 1 itself, and generate the corresponding location data. The rest of the method of the present invention may then be performed similar to the embodiments described hereinabove with some modifications for providing both the control system 8 as well as the smart phone 21 with the necessary information for performing the method.

Figure 9:
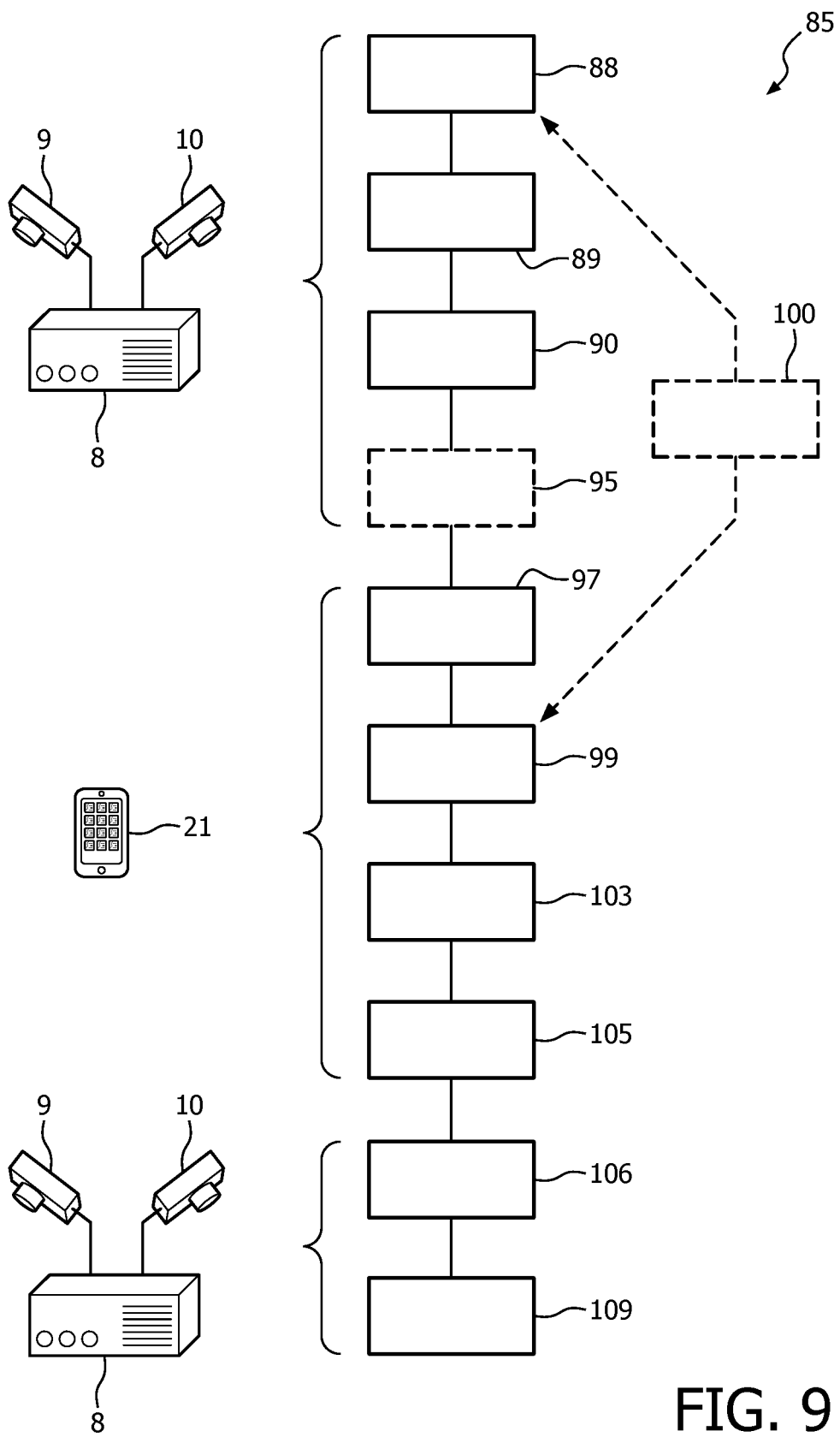
FIG. 9 schematically illustrates an embodiment of the method of the present invention.

An example embodiment of the method of the present invention is schematically illustrated in FIG. 9 by a sequence of steps. In FIG. 9, in accordance with a first embodiment 85 of the method of the present invention, the control system 8 with monitoring cameras 9 and 10 is operated to receive images of the space 1 to be monitored in step 88. From these images, in step 89 location data of the location of a mobile communication device is determined. This may for example be achieved by a method as schematically illustrated in FIG. 2. Then, in step 90 of FIG. 9, the location data determined by the control system 8 is transmitted by the control system 8 to the mobile communication device 21. Optionally, as indicated by the dashed box 95, the control system may provide gesture zone definition data of an existing gesture zone, or of multiple existing gesture zones, to the mobile communication device 21. The optional step 95 may for example be performed such as to allow the user to detect and modify existing gesture zones using his mobile communication device, for example using augmented reality wherein a visual representation of the existing gesture zones is visualized on screen as an overlay to the live images from the on-board camera 61 of the mobile communication device 21.

Having received the required information, the mobile communication device 21 then in step 97 provides feedback to the user 20 by providing a feedback signal to an output unit of the mobile communication terminal 21. The feedback signal provides feedback information on the location data, and optionally on any existing gesture zones stored in the control system. As may be appreciated, additional feedback may be provided e.g. including feedback on standard default gesture zones or actual size and other properties thereof. The skilled person may recognize various feedback possibilities that may be performed during step 97 of providing feedback. In step 99, the mobile communication terminal 21 receives input from user 20. The input provided by user 20 may be directed at establishing or modifying gesture zone definition data to be generated. For example, feedback may be provided by the touch sensitive screen of the mobile communication unit 21, as illustrated in FIGS. 3-7 hereinabove. Feedback, however, may also be provided using a keyboard present on a mobile communication device, or any other input means.

Based on the input received in step 99, the controller of mobile communication device 21 establishes instruction commands for modifying the gesture zone definition data to be established, in step 103. Then in step 105, the instructions are transmitted by the mobile communication device 21 to the control system 8. The control system 8, in turn, determines the gesture zone definition data in step 106 based on the instructions received from the mobile communication terminal, and based on the information already available to the control system 8, such as the location data of the mobile phone 21. Then, in step 109, the gesture zone definition data is stored in the control system for use thereof.

It is noted, with respect to FIG. 9, that the suggested method steps of the method 85 are performed by the control system 8 or mobile communication device 21 as indicated on the left side of FIG. 9. However this is merely exemplary, and the skilled person may appreciate that some of the method steps may be performed by other entities, or may be performed by the control system 8 whereas such a step is indicated in FIG. 9 to be performed by the smart phone 21, or vice versa.

As a further optional method step to the method 85, in step 100 the mobile phone 21 may be moved along a path through the room 1, which may be detected for example by the monitoring cameras 9 and 10 of the control system 8. The control system 8 may then establish location sequence data representative of the followed path through the room 1. Alternatively, for example in the situation illustrated in FIG. 8, the mobile communication device 21 itself may establish such location sequence data. This location sequence data may then be used as input to step 99 (the step of receiving input from the user), it may for example be used for defining the gesture zone as being enclosed by the path indicated with the location sequence data.

Figure 10:
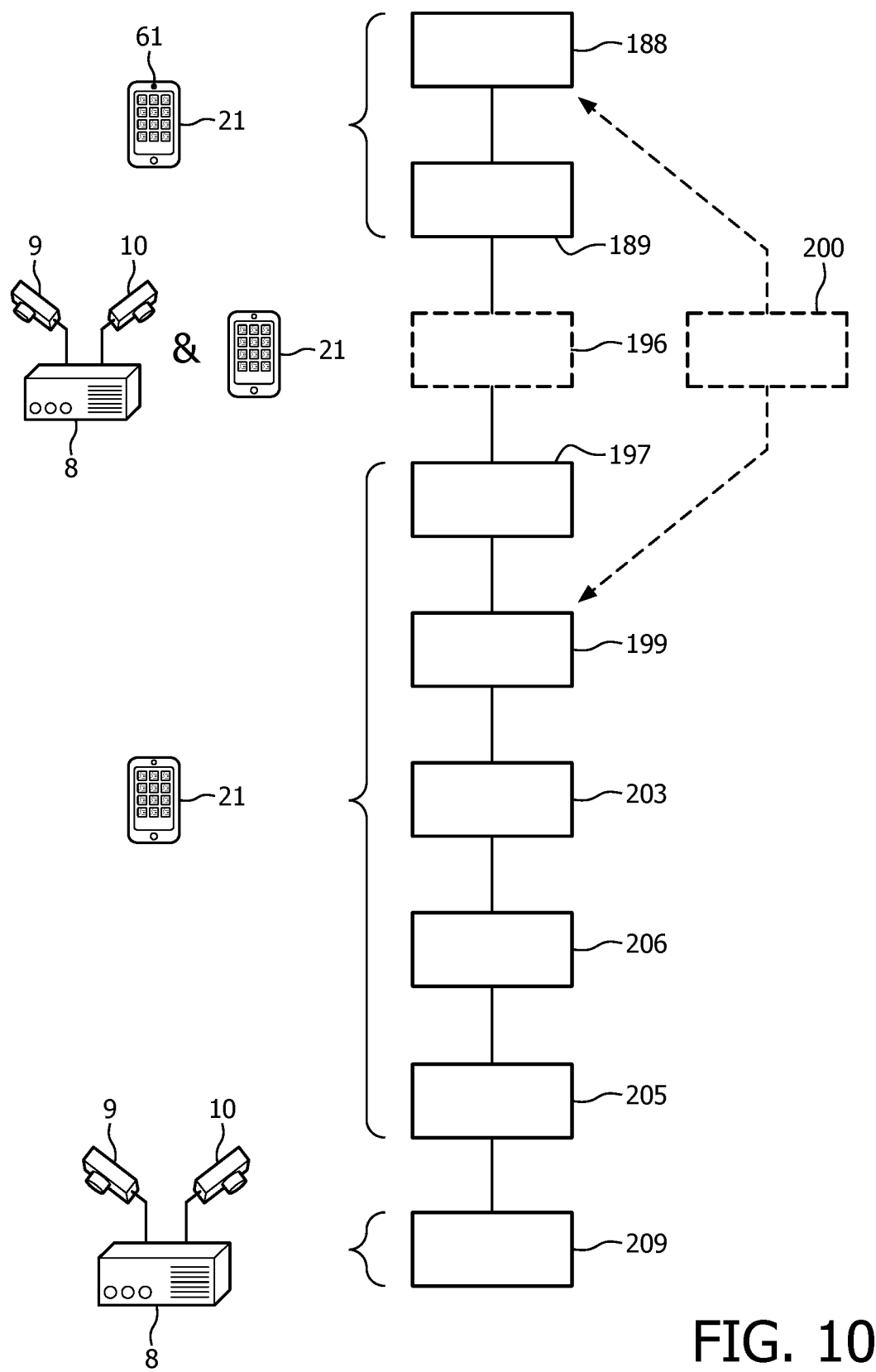
FIG. 10 schematically illustrates an embodiment of the method of the present invention.

An alternative method of the present invention is illustrated in FIG. 10. FIG. 10 is based for example on the situation illustrated in FIG. 8, wherein the location data may be established by the mobile communication device 21 itself. The method presented in FIG. 10 is more or less similar to that of FIG. 9, although the sequence of some steps has been changed, and some of the steps are performed by the mobile terminal 21 instead of the control system 8. For example, in the method illustrated in FIG. 10, step 188 indicates a step of receiving images, but these images are received from on-board camera 61 of mobile communication device 21. Then in step 189, the location data is established by the mobile communication device 21 as explained hereinbefore. Optionally in step 196, gesture zone definition data of existing gesture zones may be requested by the mobile communication terminal 21 from the control system 8. This gesture zone definition data may be transmitted in step 196 to the mobile communication device 21. In step 197, the mobile communication device provides feedback to the user 20, and in step 199 the user may provide input such as to modify or establish the gesture zone definition data. Moreover, the optional step 200 involves the movement of the mobile communication device 21 along a trajectory or path through the room 1 such as to establish location sequence data as indicated above. In step 203, instruction commands are generated based on the input received in step 199, and using these instructions and the data available to the mobile communication device 21, in step 206 gesture zone definition data will be determined by the controller of mobile communication device 21. Then, in step 205 (note that the sequence of steps 206 and 205 is different as compared to method 85 in FIG. 9), the gesture zone definition data is transmitted to the control system 8. In step 209, the control system 8 stored the gesture zone definition data for use thereof.

The present invention has been described in terms of some specific embodiments thereof. It will be appreciated that the embodiments shown in the drawings and described herein are intended for illustrated purposes only and are not by any manner or means intended to be restrictive on the invention. The context of the invention discussed here is merely restricted by the scope of the appended claims.

The invention claimed is:

1. A method of controlling one or more utility devices in an environment via a control system based on user input, wherein said user input is obtained through a mobile communication device external to said control system, the method comprising:
receiving, by a sensor device, a sensor signal and determining from the sensor signal, by a controller, a location data of the mobile communication device, the location data corresponding to a physical location of the mobile communication device within a space;
wherein the determining of the location data comprises determining location sequence data representative of a motion of the mobile communication device along a trajectory through the space and determining a gesture zone and a size or shape of the gesture zone based on the location sequence data;
providing, through the mobile communication device, a feedback signal in response to said determining of the location data, the feedback signal providing feedback information on said location data, wherein providing the feedback information includes displaying on a touch sensitive display screen of the mobile communication device an augmented reality visual representation of the determined gesture zone embedded in an image of the space;
receiving, via the touch sensitive display screen of the mobile communication device, an input signal indicative of a manipulation instruction command, wherein receiving the input signal comprises manipulating the augmented reality visual representation of the gesture zone on the display screen by touch gestures and generating manipulation instruction commands corresponding to said manipulating, wherein the manipulation instruction commands include changing a size and a shape of the gesture zone;
modifying by the controller, based on said manipulation instruction command and the location data of the mobile communication device, at least one spatial dimension of the gesture zone defined by the location data;

generating, by the controller, the gesture zone within the space based on the modified gesture zone; and monitoring the generated gesture zone within the space in order to identify user gesture inputs within the generated gesture zone and operating, by the control system, the one or more utility devices according to the identified user gesture inputs.

2. The method according to claim 1, wherein:

the sensor device is comprised by the control system, said method further comprising the control system transmitting the location data to the mobile communication device in response said determining of the location data; or the sensor device is comprised by the mobile communication device, said method further comprising the mobile communication device transmitting the location data to the control system.

3. The method according to claim 1, wherein the sensor device is at least one element of a group comprising: an image capture device for receiving images and determining the location data from the images, an ultrasound transceiver, a radio frequency (RF) transceiver, and a communications module arranged for determining a communication signal strength.

4. The method according to claim 1, wherein the sensor device is an image capture device comprised by the mobile communication device, and wherein the controller determines the location data of the mobile communication device by establishing model data of the space based on received images and determining a location of a view point of the image capture device based on the model data.

5. The method according to claim 1, further comprising the mobile communication device receiving an existing gesture zone definition data of an existing gesture zone from the control system for displaying on or modifying by the mobile communication device.

6. The method according to claim 5, further comprising determining a modified gesture zone definition data for modifying the existing gesture zone.

7. The method according to claim 1, wherein the mobile communication device comprises at least one element of a group comprising:

an accelerometer or a gyroscope, wherein the user input includes motion data of the mobile communication device, a keyboard or button, an audio sensor, wherein the user input comprises a sound or voice command.

8. The method according to claim 1, wherein the step of receiving a sensor signal by a sensor device comprises receiving by the mobile communication device images of the space obtained using an image capture device, and wherein the location data is determined from the images.

9. A computer program product comprising non-transitory computer readable instructions that, when executed by a processor, cause a mobile communication device to perform a method of controlling one or more utility devices in an environment via a control system based on user input, wherein the mobile communication device is external to said control system, the method comprising:

receiving, by a sensor device, a sensor signal and determining from the sensor signal, by a controller, a location data of the mobile communication device, the location data corresponding to a physical location of the mobile communication device within a space;

wherein the determining of the location data comprises determining location sequence data representative of a motion of the mobile communication device along a trajectory through the space and determining a gesture zone and a size or shape of the gesture zone based on the location sequence data;

providing, through the mobile communication device, a feedback signal in response to said determining of the location data, the feedback signal providing feedback information on said location data; wherein providing the feedback information includes displaying on a touch sensitive display screen of the mobile communication device an augmented reality visual representation of the determined gesture zone embedded in an image of the space;

receiving, via the touch sensitive display screen of the mobile communication device, an input signal indicative of a manipulation instruction command, wherein receiving the input signal comprises manipulating the augmented reality visual representation of the gesture zone on the display screen by touch gestures and generating manipulation instruction commands corresponding to said manipulating, wherein the manipulation instruction commands include changing a size and a shape of the gesture zone;

modifying, by the controller, based on said manipulation instruction command and the location data of the mobile communication device, at least one spatial dimension of the gesture zone defined by the location data;

generating, by the controller, the gesture zone within the space based on the modified gesture zone; and monitoring the generated gesture zone within the space in order to identify user gesture inputs within the generated gesture zone and operating, by the control system, the one or more utility devices according to the identified user gesture inputs.

10. A system for controlling one or more utility devices in an environment, the system comprising:

a mobile communication device;

a control system external to the mobile communication device comprising an image capture device for obtaining images from a space, and a controller for determining from said images location data of the mobile communication device in said space, the location data corresponding to a location of the mobile communication device, wherein the determining of the location data comprises determining location sequence data representative of a motion of the mobile communication device along a trajectory through the space and determining a gesture zone and a size or shape of the gesture zone based on the location sequence data, wherein the control system further comprises a transceiver for exchanging data with the mobile device, for providing the location data to the mobile communication device and for receiving gesture zone definition data from the mobile communication device;

where the mobile communication device provides a feedback signal in response to said determining of the location data, the feedback signal providing feedback information on said location data; wherein providing the feedback information includes displaying on a touch sensitive display screen of the mobile communication device an augmented reality visual representation of the determined gesture zone embedded in an image of the space;

wherein the mobile communication device receives, via the touch sensitive display screen of the mobile communication device, an input signal indicative of a manipulation instruction command, wherein receiving the input signal comprises manipulating the augmented reality visual representation of the gesture zone on the display screen by touch gestures and generating manipulation instruction commands corresponding to said manipulating, wherein the manipulation instruction commands include changing a size and a shape of the gesture zone;

wherein the mobile communication device modifies based on said manipulation instruction command and the location data of the mobile communication device at least one spatial dimension of the gesture zone defined by the location data;

receiving, by the control system, from the mobile communication device, the modified gesture zone and generating the gesture zone within the space based on the modified gesture zone; and monitoring, by the control system, the generated gesture zone within the space in order to identify user gesture inputs within the generated gesture zone and operating the one or more utility devices according to the identified user gesture inputs.

* * * * *